United States Patent [19]

Hilbig

[11] Patent Number: 4,599,159
[45] Date of Patent: Jul. 8, 1986

[54] ELECTROLYTIC POOL CHLORINATOR HAVING DISTRIBUTION CHAMBER FOR FILLING ANODE AND CATHODE CHAMBERS

[76] Inventor: Herbert H. Hilbig, 3125 W. Paradise Dr., Phoenix, Ariz. 85029

[21] Appl. No.: 738,696

[22] Filed: May 28, 1985

[51] Int. Cl.⁴ .................... C25B 1/26; C25B 1/34
[52] U.S. Cl. ................................. 204/266; 204/98; 204/128; 204/263
[58] Field of Search .............. 204/98, 128, 263–266, 204/272, 274, 276

[56] References Cited

U.S. PATENT DOCUMENTS

| | | | |
|---|---|---|---|
| 914,856 | 3/1909 | Meyer | 204/128 |
| 3,223,242 | 12/1965 | Murray | 210/139 |
| 3,563,879 | 2/1971 | Richards et al. | 204/272 |
| 3,570,310 | 3/1971 | Densmore | 73/204 |
| 3,767,557 | 10/1973 | Lamm | 204/266 |
| 3,972,974 | 8/1976 | Lamm | 204/266 |
| 4,040,919 | 8/1977 | Eng | 204/98 |
| 4,115,218 | 9/1978 | Krumpelt | 204/98 |
| 4,129,493 | 12/1978 | Tighe et al. | 204/228 |
| 4,136,005 | 1/1979 | Persson et al. | 204/266 |
| 4,171,256 | 10/1979 | Themy | 204/128 |
| 4,202,738 | 5/1980 | Stillman | 204/128 |
| 4,229,272 | 10/1980 | Yates | 204/128 |
| 4,248,681 | 2/1981 | Sweeny | 204/128 |
| 4,248,715 | 2/1981 | Olivier | 204/128 |
| 4,256,552 | 3/1981 | Sweeney | 204/98 |
| 4,290,873 | 9/1981 | Weaver | 204/128 |
| 4,308,123 | 12/1981 | Lynn | 204/266 |
| 4,361,471 | 11/1982 | Kosarek | 204/128 |
| 4,381,240 | 4/1983 | Russell | 204/128 |
| 4,411,759 | 10/1983 | Olivier | 204/128 |
| 4,439,295 | 3/1984 | Richards | 204/128 |
| 4,472,256 | 9/1984 | Hilbig | 204/128 |
| 4,481,086 | 11/1984 | Bianchi et al. | 204/128 |
| 4,484,991 | 11/1984 | Angelo et al. | 204/128 |
| 4,496,452 | 1/1985 | Bianchi | 204/128 |
| 4,500,404 | 2/1985 | Tucker | 204/266 |

OTHER PUBLICATIONS

Chlormaker International, Inc., product literature, publication date unknown.

*Primary Examiner*—John F. Niebling
*Assistant Examiner*—Terryence Chapman
*Attorney, Agent, or Firm*—Cahill, Sutton & Thomas

[57] ABSTRACT

An electrolytic pool chlorinator for chlorinating a swimming pool includes a water distribution chamber which automatically distributes fresh pool water to a brine tank, to a cathode chamber, and to a packed column in which liberated chlorine gas is intermixed with pool water before being returned to the pool. The water distribution chamber includes a first compartment for continuously receiving pool water and having a hole therein for distributing water to the brine tank. A second compartment contiguous with the first compartment of the water distribution chamber receives pool water which spills over from the first compartment. A conduit conveys water from the second compartment to the cathode chamber for continuously diluting the concentration of sodium hydroxide therein. The conduit delivers pool water to the cathode chamber at a controlled rate and at a point relatively remote from the cathode to prevent calcium deposit formations upon the cathode. An overflow conduit communicating with the cathode chamber continuously flushes excess concentrations of sodium hydroxide and maintains the proper level of catholyte. A replaceable ion-permeable membrane assembly is secured over the open end of the cathode chamber tube by a circular nut to permit convenient replacement of the membrane. Pool water received by the chlorinator is used to cool the electrical power supply components of the chlorinator, and a safety thermostatic switch deactivates the chlorinator if the flow of pool water is interrupted.

18 Claims, 10 Drawing Figures

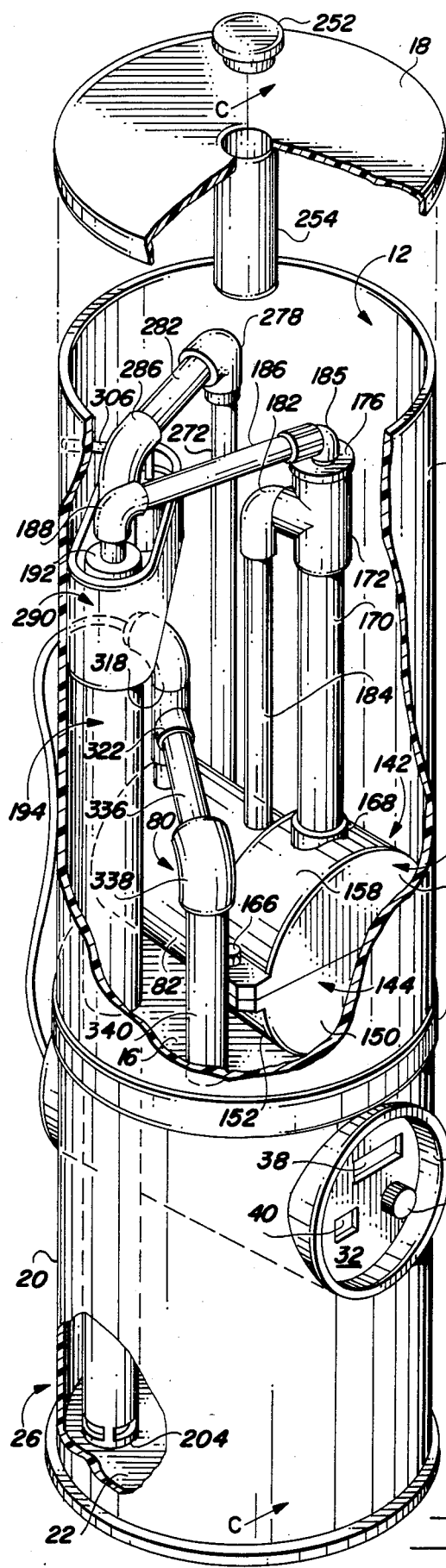
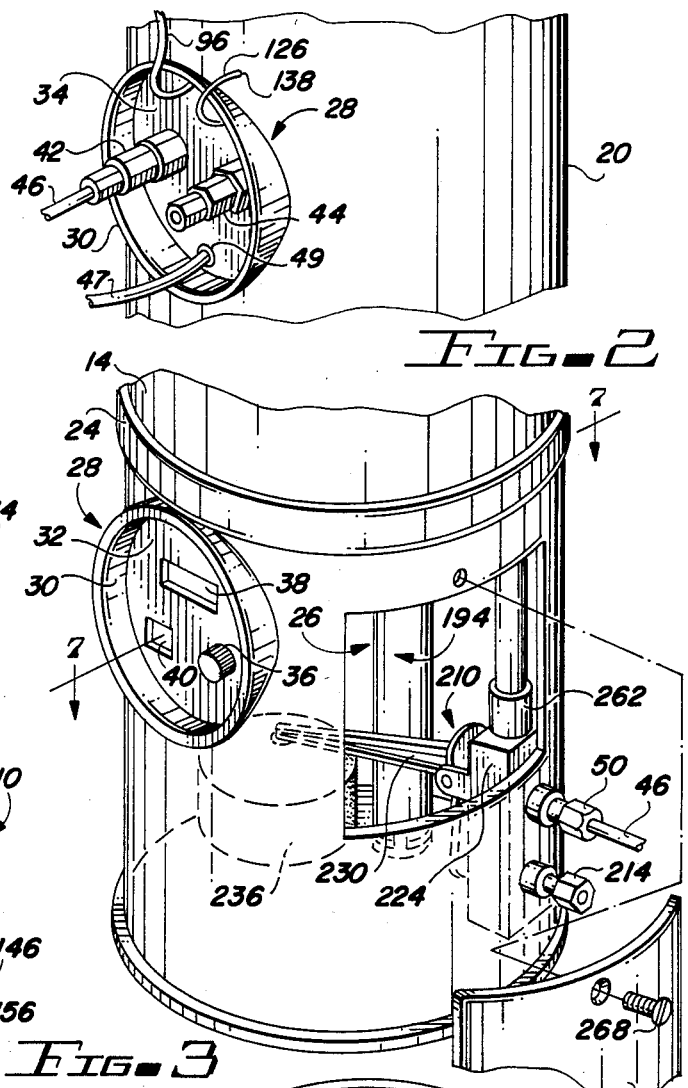
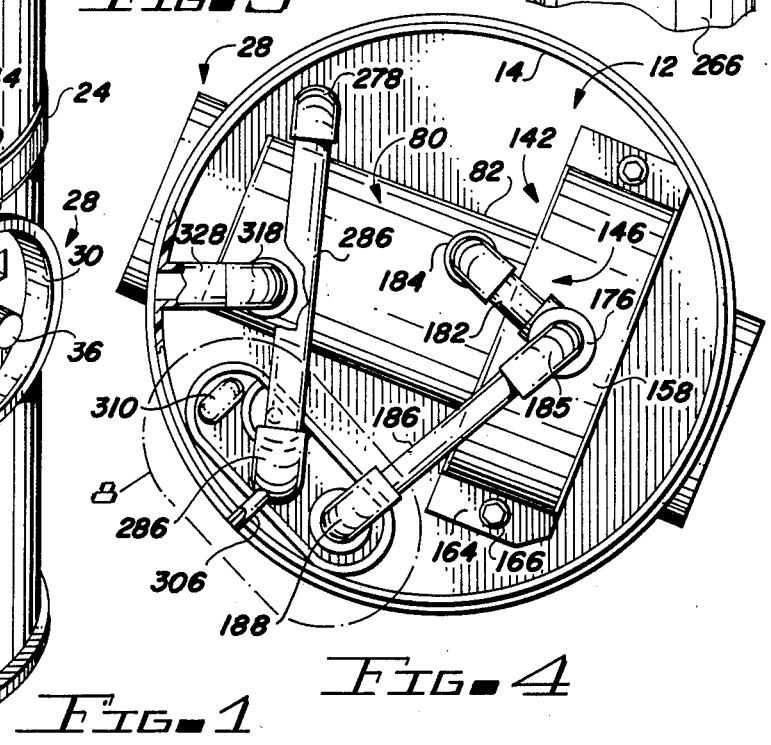
FIG-1  FIG-2  FIG-3  FIG-4

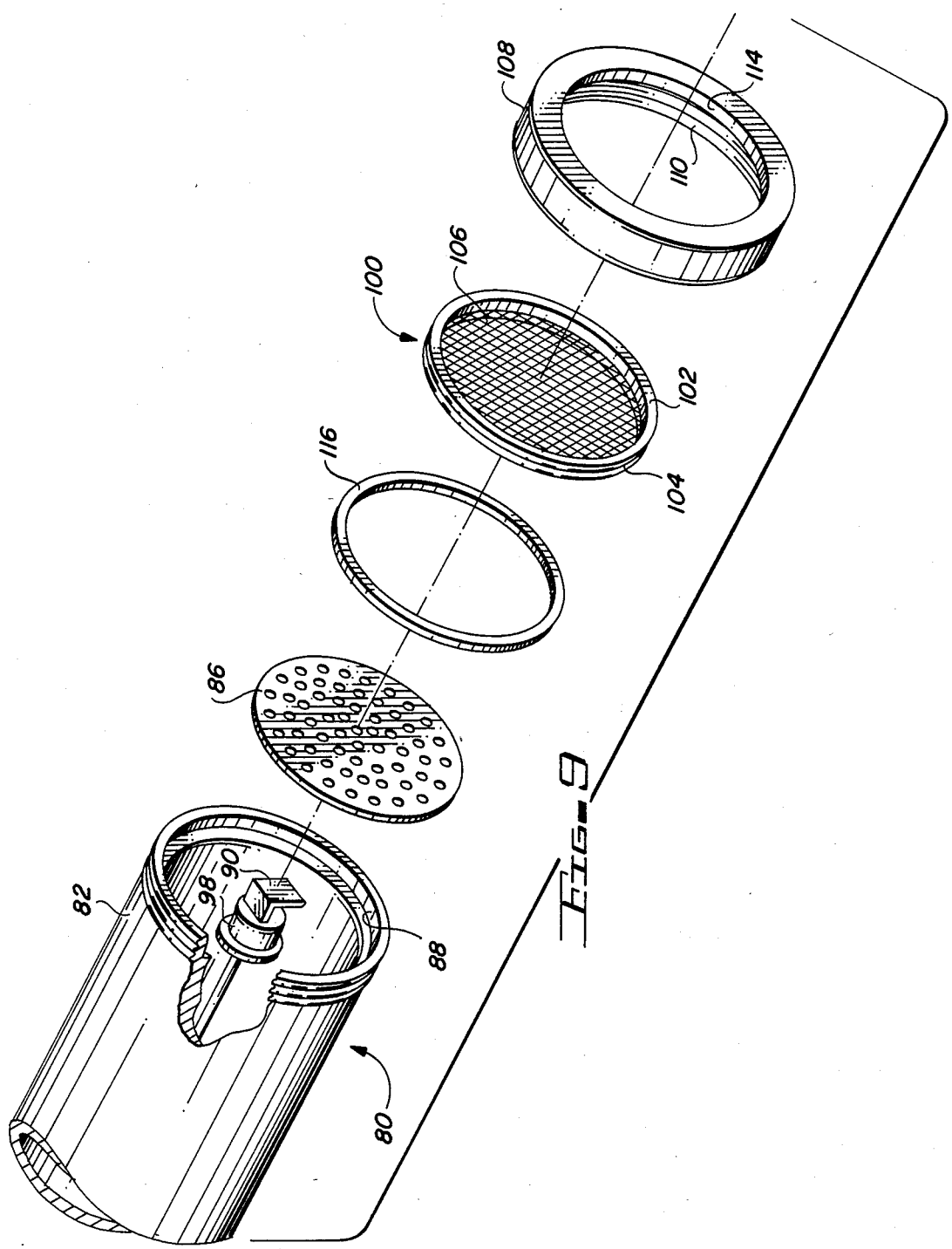

ELECTROLYTIC POOL CHLORINATOR HAVING DISTRIBUTION CHAMBER FOR FILLING ANODE AND CATHODE CHAMBERS

BACKGROUND OF THE INVENTION

1. Field of the Invention

The present invention relates generally to electrolytic pool chlorinators for chlorinating a pool of water, and more particularly, to an electrolytic pool chlorinator having anode and cathode chambers to which fresh pool water is continuously added to automatically maintain the fluid levels of the anolyte and catholyte within the anode and cathode chambers, respectively.

2. Description of the Prior Art

Electrolytic pool chlorinators are well known in the art and are exemplified by the apparatus described in the following U.S. Pat. Nos. 914,856, issued to Meyer; 3,223,242, issued to Murray; 4,229,272, issued to Yates; 4,129,493, issued to Tighe, et al.; 4,136,005, issued to Persson, et al.; 4,290,873, issued to Weaver; and 4,500,404, issued to Tucker. Such electrolytic pool chlorinators generally operate by electrolyzing a sodium chloride solution contained within an anode chamber, attracting positively charged sodium ions to a negatively charged cathode and liberating chlorine gas at the anode. The chlorine gas released thereby may then be used to chlorinate the water within a swimming pool, spa or the like.

The anode and cathode chambers of such an electrolytic pool chlorinator are typically separated from one another by an ion-permeable barrier to prevent the chlorine gas liberated within the anode chamber from mixing with the hydrogen gas liberated in the cathode chamber and to physically separate the sodium chloride (or brine) anolyte solution within the anode chamber from the sodium hydroxide (caustic soda) catholyte solution within the cathode chamber. The ion-permeable membrane is permeable to positive ions, such as sodium ions formed within the anode chamber, but presents a barrier to the passage of negative ions, such as hydroxyl ions, present within the cathode chamber, at least at relatively low concentrations of such hydroxyl ions.

While electrolytic pool chlorinators of the type described above greatly simplify swimming pool maintenance by eliminating the need to regularly add chlorine to the pool water, as by adding chlorine in solid, liquid or gaseous form at regular intervals, known pool chlorinators are not themselves maintenance free. The brine solution within the anode chamber becomes depleted over time and must be replenished. Even if the anode chamber is made rather large to accommodate a large quantity of solid salt, water must periodically be added to the anode chamber to continuously dissolve such salt to form the brine solution.

Similarly, the level of fluid within the cathode chamber must also be maintained, and the concentration of sodium hydroxide within the catholyte must periodically be reduced, as by substantially draining the cathode chamber and refilling the same with water. If the concentration of hydroxyl ions within the cathode chamber becomes excessive, back-migration of hydroxyl ions through the ion-permeable barrier will result, decreasing the efficiency of the chlorinator and causing other problems described in greater detail below. Many of the prior art chlorinators require the user to periodically drain the cathode chamber and to refill it with water to avoid excessive accumulations of sodium hydroxide within the cathode chamber.

Prior art chlorinators are known wherein attempts have been made to simplify maintenance requirements for filling the anode and cathode chambers. For example, U.S. Pat. No. 4,229,272 issued to Yates illustrates a pair of manually operated valves which may be used to fill the anode and cathode chambers of the chlorinator with fresh pool water. Nonetheless, the user must remember to periodically operate such manual valves, or they will otherwise be of no benefit to the user. U.S. Pat. No. 4,500,404 issued to Tucker automatically supplies water to both the anode and cathode chambers of the electrolytic chlorinator described therein. However, the Tucker apparatus requires a supply of tap water, rather than pool water, for filling the anode and cathode chambers and further requires a water softening resin chamber within the chlorinator to further reduce the hardness of the incoming tap water. While this apparatus serves to eliminate the maintenance chore of filling the anode and cathode chambers, the user must then periodically service the resin chamber by recharging the softening resin.

U.S. Pat. No. 3,563,879 to Richards, et al. discloses an electrolytic chlorine generator wherein pressurized pool water is in fluid communication with the anode and cathode chambers of the chlorine generator. However, as electrolysis proceeds within the chlorine generator, the pressure of the chlorine gas in the anode chamber and the hydrogen gas in the cathode chamber rise to a pressure exceeding that of the pressurized pool water. Consequently, no water is added to the anode or cathode chambers during operation of the chlorinator. Only after the pool circulating pump and the power supply to the chlorinator are turned off, and the pressure within the anode and cathode chambers dissipates, can fresh pool water be pumped into the anode and cathode chambers when the pool pump is restarted.

U.S. Pat. No. 4,136,005 issued to Persson, et al. describes an electrolytic pool chlorinator wherein a brine source is provided apart from the anode chamber of the electrolytic cell. A discontinuous water metering device incorporating a solenoid valve, and related electronic controls, is provided for intermittently feeding pool water to the brine source, and to the cathode chamber of the electrolytic cell. While the apparatus disclosed in the Persson, et al. patent serves to maintain the proper levels of anolyte and catholyte within the electrolytic cell, the requirements for a separate brine source and the complexity of the water metering device are disadvantageous.

Accordingly, it is an object of the present invention to provide an electrolytic pool chlorinator which automatically maintains the proper level of anolyte and catholyte within the anode and cathode chambers, respectively, without reliance upon the operation of manual valves or periodic interruptions in operation.

It is another object of the present invention to provide a relatively maintenance free electrolytic pool chlorinator which uses pool water to fill and maintain the level of anolyte within the anode chamber, and to fill and continuously dilute the catholyte within the cathode chamber, thereby avoiding the necessity for connection of the chlorinator to a municipal water supply.

It is still another object of the present invention to provide such an electrolytic pool chlorinator which continuously flushes sodium hydroxide from the cathode chamber in order to maintain a relatively low caustic concentration therein.

It is yet another object of the present invention to provide such an electrolytic pool chlorinator which avoids substantial pressurization of the anode and cathode chambers.

It is further object of the present invention to provide such a pool chlorinator which incorporates a relatively large anode chamber having a large salt capacity without requiring a separate brine source.

It is a still further object of the present invention to provide such an electrolytic pool chlorinator which is of relatively simple and inexpensive construction.

As mentioned above, sodium hydroxide is formed within the cathode chamber as a result of the electrolysis process. Excess sodium hydroxide concentrations within the cathode chamber must be avoided to prevent significant amounts of back-migration of hydroxyl ions through the ion-permeable membrane and back into the anode chamber when electrical power is cut off from the electrolytic cell. Since residential swimming pool circulation systems are typically operated less than twelve hours each day, the chlorinator power supply is likely to be off more than it is on, and consequently, back-migration of hydroxyl ions can become significant as concentrations of sodium hydroxide rise within the cathode chamber. The efficiency of an electrolytic pool chlorinator may be reduced in several ways as a result of excessive hydroxyl ion concentration within the catholyte. For known electrolytic pool chlorinators, when hard water, i.e., water containing relatively high levels of calcium, is added to the cathode chamber, calcium deposits typically form upon the cathode, particularly when the hydroxyl ion concentration within the catholyte is high. The formation of calcium deposits upon the cathode causes the cathode to appear more resistive resulting in increased heat dissipation into the electrolytic cell and reduced current efficiency. Furthermore, hydroxyl ions which back-migrate through the ion-permeable membrane often combine with calcium in the anolyte to form chlorates which effectively reduce the amount of sodium chloride which can be dissolved within the anolyte. In addition, the presence of hydroxyl ions within the anolyte can lead to passivation of the anode resulting from increased oxidation which occurs at higher pH within the anolyte. Hydroxyl ions within the anolyte also contribute to the formation of calcium deposits upon the anode side of the ion-permeable membrane, which deposits lead to the plugging of the membrane and a corresponding reduction in the efficiency of the chlorinator.

Those skilled in the art have attempted to deal with the aforementioned problems associated with excessive hydroxyl ion concentration within the catholyte and related calcium deposits. For example, U.S. Pat. No. 4,204,921 issued to Britton, et al. describes the periodic addition of an acid to the catholyte for dissolving calcium deposits from the cathode. U.S. Pat. No. 4,040,919 describes a method of dissolving deposits upon the membrane by increasing the acidity of the anolyte and simultaneously diluting the catholyte while operating the cell at a reduced current density. Clearly, both of the processes described in these patents suffer from the disadvantage of requiring periodic additions of acid to the electrolytic chlorinator.

U.S. Pat. No. 4,115,218, issued to Krumpelt describes a commercial process for the electrolysis of sodium chloride to produce a caustic, and wherein electrolytic cell inefficiencies are reduced by periodically flushing the catholyte compartment and operating the cell at reduced current. However, the process described in this patent requires the use of highly pure brine having a calcium content of six parts per million or less, thereby requiring special processing of the sodium chloride used to form the brine. Furthermore, the requirement for brine of such purity would rule out the use of swimming pool water within the anode chamber of such an electrolytic cell since swimming pool water typically has a calcium hardness of 200–250 parts per million.

U.S. Pat. No. 4,129,493 issued to Tighe, et al. discloses a swimming pool chlorinator having a cathode chamber having an inlet for receiving a supply of deionized water and an outlet for discharging sodium hydroxide. The deionized water is supplied by an ion exchange column coupled to the municipal water supply.

As noted above, U.S. Pat. No. 4,500,404 issued to Tucker discloses a similar apparatus for supplying water to the cathode chamber. While the apparatus disclosed in both such patents minimizes the likelihood of calcium deposits upon the cathode by physically limiting the introduction of calcium thereto, both such systems suffer the disadvantage of not being able to use pool water from the pool being chlorinated in order to dilute the catholyte.

As noted above, U.S. Pat. No. 3,563,879 periodically introduces pool water into the cathode chamber and dilutes the sodium hydroxide therein. However, such pool water is introduced into the cathode chamber only after operation of the chlorinator is discontinued and only after the pool circulation pump is shut off and later restarted. Significant amounts of sodium hydroxide may be left remaining within the cathode chamber between operating cycles of the chlorinator, thus permitting back-migration of hydroxyl ions.

U.S. Pat. No. 4,136,005 issued to Persson, et al. periodically introduces pool water into the catholyte compartment to dilute the catholyte. The cathode compartment includes an overflow passage for allowing excess catholyte to drain from the cathode compartment. However, fresh pool water is discharged into the cathode compartment in relatively close proximity to the cathode. The present inventor has determined that the discharge of relatively hard water into the cathode compartment in close proximity with the cathode induces the formation of calcium deposits upon the cathode due to the highly alkaline localized region surrounding the cathode during operation of the electrolytic cell.

Accordingly, it is an object of the present invention to provide an electrolytic pool chlorinator which minimizes the likelihood of calcium deposits upon the cathode and ion permeable membrane of the electrolytic chlorinator.

It is another object of the present invention to provide such an electrolytic chlorinator which minimizes the likelihood of formation of chlorates within the anolyte and minimizes the likelihood of anode passivation due to high pH conditions within the anolyte.

It is yet another object of the present invention to provide such an electrolytic pool chlorinator which continuously and automatically maintains a relatively low sodium hydroxide concentration within the cathode chamber to minimize back-migration of hydroxyl ions into the anode chamber when the power supply of the chlorinator is shut off.

It is a further object of the present invention to provide such an electrolytic pool chlorinator which avoids the need for specially treated water or specially purified brine and wherein ordinary pool water may be used to continuously dilute the concentration of sodium hydroxide within the cathode chamber.

A further object of the present invention is to provide such a pool chlorinator wherein ordinary pool water may be added to the cathode chamber to dilute the sodium hydroxide concentration therein without simultaneously forming calcium deposits upon the cathode.

The problem of the plugging of the ion-permeable membrane with calcium deposits associated with many known prior art chlorinators has already been noted above. Apart from membrane plugging, the membrane typically requires replacement every two-four years in view of regular wear and resulting tearing of the membrane. Most of the electrolytic pool chlorinators which have been made commercially available or which have been described in the patent literature are not so constructed as to permit the replacement of the ion-permeable membrane in a convenient and inexpensive manner. U.S. Pat. No. 3,972,794 issued to Lamm discloses several configurations of an electrolytic cell for generating chlorine wherein various components of the electrolytic cell are assembled as a removable cartridge, typically including the anode, ion-permeable membrane and other components. The apparatus described by Lamm appears to suffer from several disadvantages, including the need for substantial disassembly of the electrolytic cell to remove the replaceable cartridge, the requirement for replacing more than just the ion-permeable membrane, as well as the requirement for a rather bulky and apparently expensive replacement cartridge. The electrolytic cell described in the Lamm patent does not appear to lend itself to being serviced by the typical owner of a residential swimming pool.

Accordingly, it is an object of the present invention to provide an electrolytic pool chlorinator incorporating an easily replaceable ion-permeable selective membrane capable of being replaced by a typical owner of a residential swimming pool without requiring substantial disassembly of the chlorinator.

It is another object of the present invention to provide such a replaceable membrane in a form which is relatively inexpensive, compact, and easy to handle.

With regard to prior art electrolytic pool chlorinators of the type described above, such chlorinators are typically designed to operate in conjunction with the conventional water recirculation system of the pool. Often, such chlorinators rely upon a pressurized flow of pool water produced by the pool pump in order to intermix liberated chlorine gas with the pool water. Should the electrolytic pool chlorinator continue to operate after the pool pump is turned off, there arises the danger that chlorine gas generated by the chlorinator would either escape into the area surrounding the chlorinator or accumulate under dangerous pressure within the chlorinator.

It is known to connect the power supply for an electrolytic pool chlorinator to the same timer switch which controls the application of electrical power to the pool pump motor for insuring that electrical power to the chlorinator is turned off at the same time that electrical power to the pool pump motor is turned off. However, circumstances may arise wherein the flow of pool water through the circulation system is stopped even through electrical power is being supplied to the pool pump motor; for example, the pool pump motor may either fail or lose its prime. U.S. Pat. No. 4,256,552 issued to Sweeney describes an electrolytic chlorine generator which, in one case, is energized in response to a pressure switch that operates whenever water is circulating through the pool pump recirculation system. No details are provided regarding such a pressure switch. In any event, mechanically operated pressure switches are likely to fail when exposed to relatively hard pool water containing calcium and other minerals.

In view of the foregoing, it is an object of the present invention to provide an electrolytic pool chlorinator of the general type wherein liberated chlorine gas is intermixed with a stream of pool water, which chlorinator terminates the further production of chlorine gas if the stream of pool water is interrupted.

It is a further object of the present invention to provide such a pool chlorinator which inexpensively and reliably senses an interruption in the stream of pool water to terminate the further generation of chlorine gas.

Another problem related to prior art electrolytic pool chlorinators regards the adequate cooling of the power supply which produces the direct current voltage across the anode and cathode elements. Typically, the power supply housing is provided with air vents for allowing air to circulate through and cool the power supply components, primarily the transformer used to convert 110 volt or 220 volt alternating current to a relatively low voltage alternating current and the rectifier which subsequently converts the low voltage alternating current to a low voltage direct current potential. However, the presence of such vents in the power supply housing prevents the power supply from being a sealed unit; consequently, water splashed onto the power supply housing from rain, from the swimming pool, or from hoses used in the pool area can enter the power supply housing and corrode the power supply components.

It is still another object of the present invention to provide such a pool chlorinator which eliminates the need for air circulation vent holes in conjunction with the chlorinator power supply for allowing said power supply to be housed as a sealed unit.

These and other objects of the present invention will become more apparent to those skilled in the art as the description thereof proceeds.

SUMMARY OF THE INVENTION

Briefly described, and in accordance with one embodiment thereof, the present invention relates to an electrolytic pool chlorinator for chlorinating a swimming pool or other body of water, the chlorinator including a water distributor for receiving a substantially continuous stream of pool water from the pool, the water distributor continuously adding pool water to the anode chamber of the chlorinator whenever the brine solution therein falls below a predetermined level, the water distributor also continuously adding pool water to the cathode chamber of the chlorinator for maintaining a predetermined level of catholyte therein and for continuously diluting the concentration of the catholyte. The chlorinator also includes an anode disposed within the anode chamber, a cathode disposed within the cathode chamber, and an ion-permeable selective membrane dividing the cathode chamber from the anode chamber. A power supply coupled to the anode and cathode imposes a direct current electrical potential thereacross for generating chlorine gas, and the liberated chlorine gas is collected and intermixed with pool water for chlorinating the pool. The aforementioned water distributor automatically and continuously fills the anode and cathode chambers, thereby eliminating the maintenance normally required to establish and maintain the fluid levels therein. In addition, the continuous dilution of the catholyte significantly reduces the back-migration of hydroxyl ions from the cathode chamber to the anode chamber.

In the preferred embodiment of the present invention, the water distributor is located in the upper portion of the anode chamber and includes a first compartment which continuously receives pool water. The first compartment has a hole formed therein at a first predetermined height for passing pool water into the anode chamber. The water distributor also includes a second compartment having a wall in common with the first compartment, the wall extending above the first predetermined height to a second predetermined height. Pool water within the first compartment spills over the common wall into the second compartment. A conduit in fluid communication with the second compartment delivers water therefrom to the cathode chamber; the upper end of the conduit includes an inverted U-shaped portion to form a water trap within the second compartment of the water distributor to prevent the mixing of hydrogen gas within the cathode chamber and chlorine gas within the anode chamber.

In the preferred embodiment of the present invention, a packed column, similar to that disclosed in the present inventor's U.S. Pat. No. 4,472,256, is used to intermix chlorine gas and pool water. The upper end of the packed column extends into the second compartment of the water distributor and has an opening formed therein at a predetermined height through which opening pool water within the second compartment passes into the upper end of the packed column. The level of pool water within the second compartment is thereby maintained at the predetermined height.

As mentioned above, a conduit communicating with the second compartment of the water distributor continuously delivers pool water to the cathode chamber. An overflow conduit communicating with the cathode chamber permits catholyte exceeding a predetermined level to overflow from the cathode chamber, thereby maintaining the predetermined level of catholyte within the cathode chamber. Sodium hydroxide is continuously flushed from the cathode chamber via the overflow conduit, thereby substantially preventing the hydroxyl ion content of the catholyte from becoming concentrated enough to permit back-migration of hydroxyl ions after the chlorinator power supply is turned off. To minimize deposition of calcium deposits upon the cathode, fresh pool water is delivered to the cathode chamber at a point relatively remote from the cathode; in this manner, any calcium dissolved within the incoming pool water encounters an alkaline environment sufficient to precipitate such calcium as an insoluble compound in advance of the calcium reaching the cathode. Calcium deposits are therefore formed upon non-functional portions of the cathode chamber where they do not interfere with the operation of efficiency of the chlorinator. In the preferred embodiment, the cathode chamber includes a standpipe extending upwardly from the cathode chamber remote from the cathode, and fresh pool water is delivered to the upper end of the standpipe; the overflow conduit is coupled to the standpipe for carrying off catholyte displaced by the incoming pool water.

Another aspect of the present invention relates to a replaceable ion-permeable selective membrane assembly which allows for the relatively simple and inexpensive replacement of the membrane should it become clogged, worn or torn. The cathode chamber preferably includes a tubular portion having an open end and being externally threaded. The replaceable membrane assembly has a diameter substantially the same as that of the tubular portion of the cathode chamber. A circular nut is provided for retaining the membrane assembly engaged over the open end of the tubular portion of the cathode chamber. The circular nut has an internally threaded bore which engages the external threads of the tubular portion of the cathode chamber. An annular shoulder extends radially inward from the internally threaded bore for clamping the replaceable membrane assembly against the open end of the tubular portion of the cathode chamber. In order to maintain the cathode in close proximity to the membrane assembly, the tubular portion of the cathode chamber includes an annular recess formed within an internal wall thereof adjacent its open end for receiving and supporting a circular shaped cathode therein. By placing the cathode in close proximity to the ion-permeable membrane, electrical resistance to the flow of ions within the catholyte is reduced, and the cathode provides physical support for the membrane.

Still another aspect of the present invention relates to a safety feature of the chlorinator wherein pool water received by the chlorinator for mixing with liberated chlorine gas is circulated through a metal conduit in thermal contact with both a heat source and a thermostatic switch. The thermostatic switch selectively connects or disconnects electrical power to the electrical power supply of the chlorinator. The thermostatic switch is operative to detect a decrease in the flow of pool water through the metal conduit in the form of a rise in the temperature thereof and is responsive thereto by turning off the electrical power supply of the chlorinator to prevent the further generation of chlorine gas. In the preferred embodiment of the present invention, the metal conduit is a cooling tube, and the transformer and/or the rectifier of the electrical power supply is mounted in thermal contact with the cooling tube for cooling the transformer and/or the rectifier with the pool water circulated through the cooling tube.

BRIEF DESCRIPTION OF THE DRAWINGS

FIG. 1 is a cutaway perspective view of an electrolytic pool chlorinator constructed according to the teachings of the present invention.

FIG. 2 is a partial perspective view showing the rear face of a power supply housing and the water supply couplings to a cooling tube within the power supply housing.

FIG. 3 is a cutaway perspective view of the lower portion of the chlorinator showing the feeder tank and float controlled valve therein.

FIG. 4 is a top view of the chlorinator shown in FIG. 1 with the upper cover removed therefrom.

FIG. 9 is an exploded perspective view of the end of a tubular cathode chamber over which a replaceable ion-permeable selective membrane is secured in proximity to the cathode.

DETAILED DESCRIPTION OF THE PREFERRED EMBODIMENT

Figure 5A:
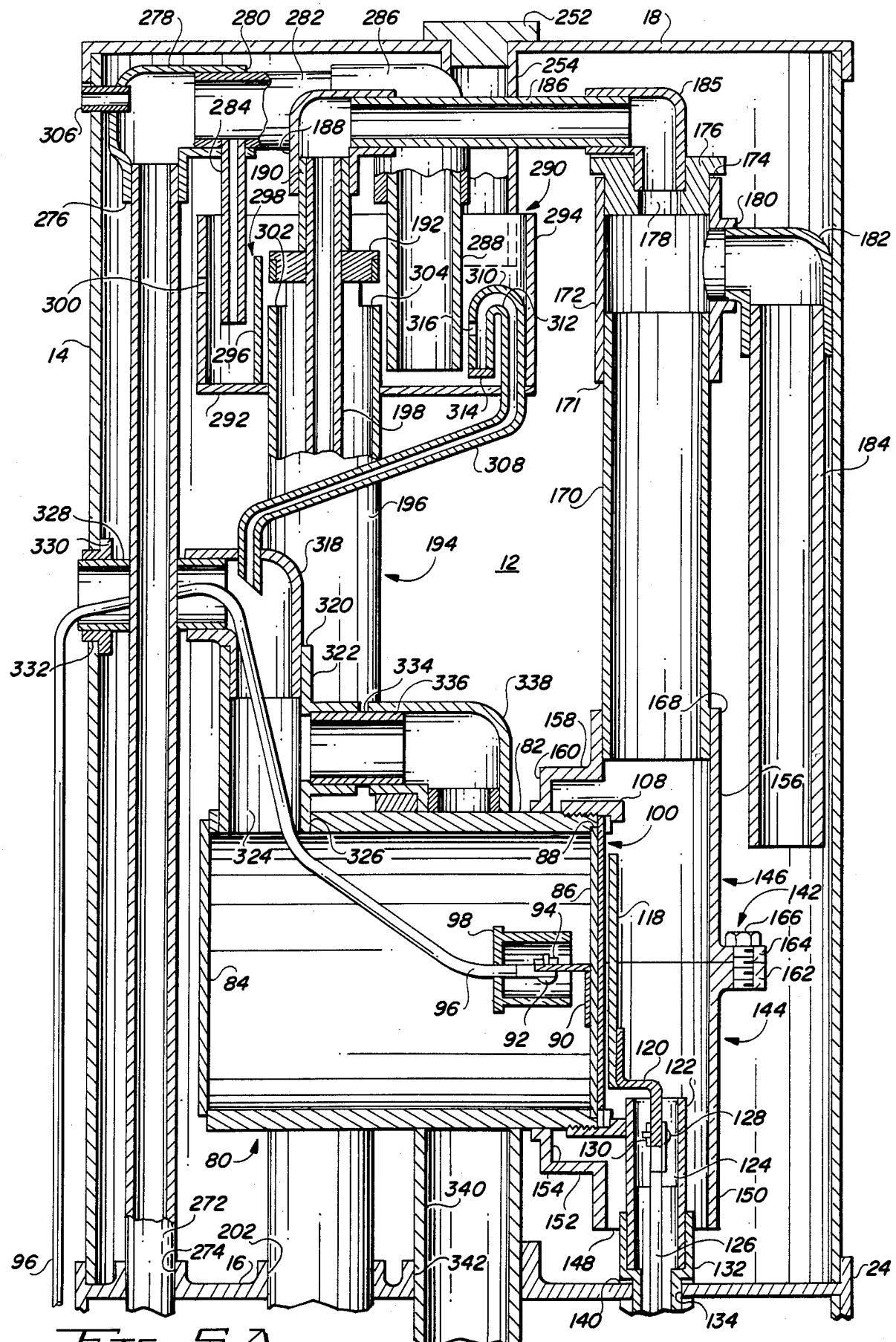
FIGS. 5A and 5B together form a cross-sectional view of the chlorinator shown in FIG. 1.

Shown in FIG. 1 is an electrolytic pool chlorinator embodying the present invention and designated generally by reference numeral 10. Chlorinator 10 includes a brine tank or anode chamber 12 formed by vertically oriented tube 14 and a circular bottom wall 16 which closes off the lower end of tube 14. The upper end of tube 14 is normally covered by a removable cover 18. Preferably, tube 14, bottom wall 16, and cover 18 are all made of polyvinyl chloride which is ideally suited to withstand the brine solution numally present within brine tank 12, as well as any chlorine gas vapors which may escape into brine tank 12. Bottom wall 16 is sealingly secured to the lower end of tube 14 by polyvinyl chloride cement.

Still referring to FIG. 1, the lower end of tube 14 and bottom wall 16 rest atop the upper end of vertically oriented tube 20, the lower end of which is closed by a dish-like bottom wall 22. In the preferred embodiment of the present invention, tube 14 and tube 20 are of the same diameter, and bottom wall 16 includes a ringed flange 24 at its outer circumference and extending both above and below the central portion of bottom wall 16 for slidingly receiving the lower end of tube 14 and the upper end of tube 20. The lower portion of tube 20 and bottom wall 22 together form a feeder tank 26 for temporarily holding chlorinated pool water for return to the swimming pool. Tube 20 and bottom wall 22 are also preferably formed of polyvinyl chloride.

Figure 5B:
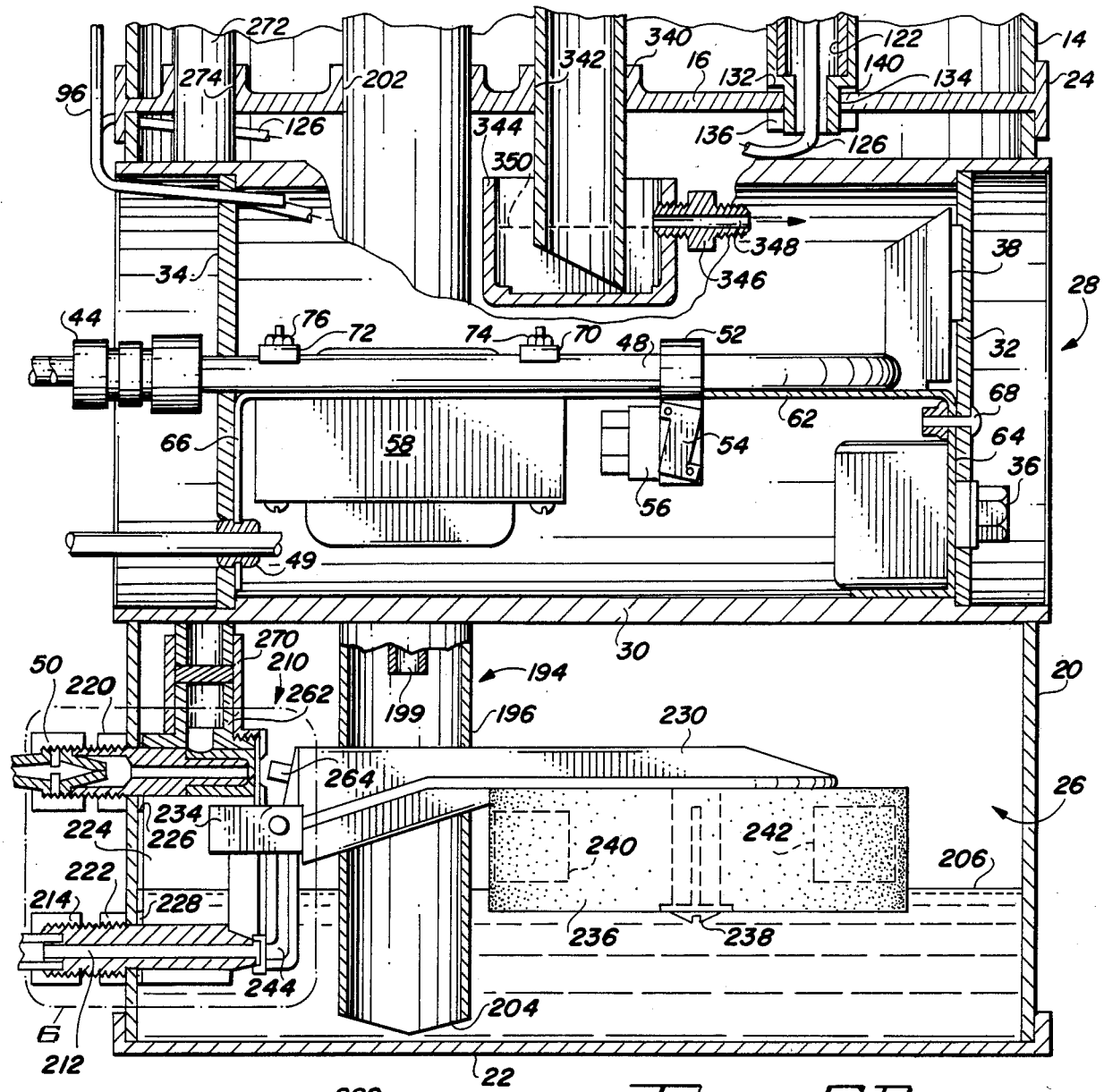

With reference to FIGS. 1 and 5B, the upper portion of tube 20 supports a cylindrical power supply housing 28 including a pdyvinyl chloride tube 30 which extends through circular openings formed in opposing sides of tube 20 just below bottom wall 16. As shown in FIG. 1, a first end of tube 30 is closed by a circular plate 32 extending perpendicular to the longitudinal axis of tube 30. Briefly referring to FIG. 2, the opposite end of tube 30 is closed by a circular plate 34 also extending perpendicular to the logitudinal axis of tube 30. Referring again to FIG. 1, visible upon faceplate 32 are a control knob 36, a meter 38, and a reset button 40. Control knob 36 is coupled to a multiple position switch within power supply housing 28 which selectively decouples electrical power from the power supply or selectively applies one of several output voltages across the anode and cathode terminals, as described below. Meter 38 is an ammeter which allows a user to monitor the electrical current flowing between the anode and cathode terminals of the chlorinator. Generally speaking, by varying the voltage applied across the anode and cathode terminals, the current conducted therebetween may be varied, and hence the rate at which chlorine gas is generated may also be varied. Reset button 40 is coupled to a circuit breaker within power supply housing 28 and allows the user to reset the circuit breaker in the event that a temporary current overload trips the circuit breaker to its inactive position. A full circuit schematic of the electrical power supply housed within power supply housing 28 is not illustrated herein since such power supplies are well known in the art.

Referring to FIG. 2, a pair of conduit connectors 42 and 44 protrude from plate 34 of power supply housing 28. Each of connectors 42 and 44 is adapted to from compression-type coupling with the end of a flexible conduit, such as tube 46 extending from connector 42 within FIG. 2. Also shown in FIG. 2 is a power cord 47 extending through grommet 49 to provide a source of 110 V. A.C. to the chlorinator power supply.

Figure 7:
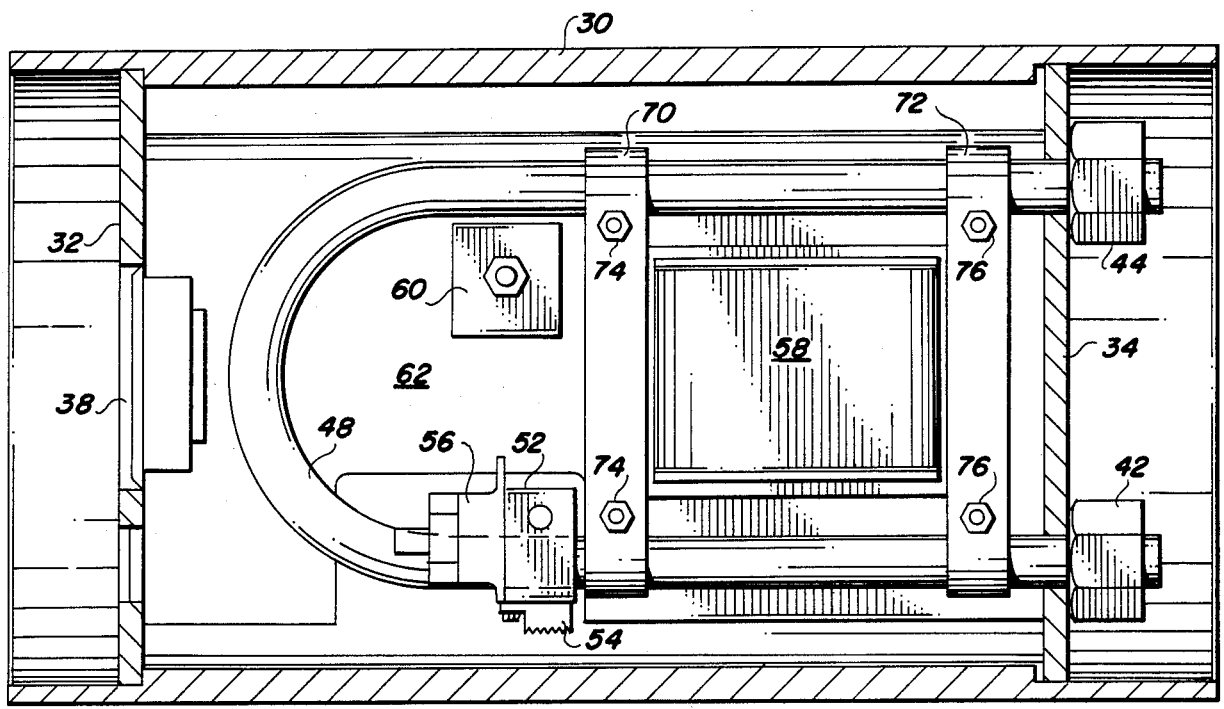
FIG. 7 is a cross-sectional view of the power supply housing taken through lines 7—7 as shown in FIG. 3.

When chlorinator 10 is installed at the site of a swimming pool, connector 44 of FIG. 2 is coupled to a tube (not shown) which communicates with the return line of a conventional swimming pool water recirculation system for receiving filtered pool water under pressure therefrom. The pressurized pool water passing into connector 44 is circulated through a U-shaped stainless steel cooling tube as shown in FIGS. 5B and 7. The pressurized stream of pool water exits cooling tube 48 through connector 42 and is conveyed by conduit 46 to a compression connector 50 (see FIG. 3) associated with a float-controlled valve described in greater detail below.

It will be recalled that one of the objects of the present invention is to provide an electrolytic pool chlorinator with a safety shut-off feature wherein the generation of chlorine gas is terminated if the flow of pool water supplied to the chlorinator is terminated. In this regard, FIGS. 5B and 7 show an aluminum bracket 52 secured to and in thermal contact with cooling tube 48. Mounted upon perpendicular faces of bracket 52 are a resistive heater 54 and a thermostat 56. Resistive heater 54 may be a 1K ohm, 25 watt device of the type manufactured by Dale, Model No. RH-25, and commercially available from Newark Electronics. Thermostat 56 may be of the type commercially available from Therm-O-Disc, a division of Emerson Electric of Mansfield, Ohio under model designation No. 60T21. Resistive heater 54 and thermostat 56 are each in thermal contact with cooling tube 48 through aluminum bracket 52. Thermostatic switch 56 is electrically connected within the 110 volt alternating current circuit which supplies electrical power to power supply transformer 58. Thermostatic switch 56 is designed to provide a closed electrical circuit when its temperature is below a predetermined temperature, while switching to an open circuit when its temperature exceeds such predetermined temperature.

Resistive heater 54 is electrically coupled to the 110 volt alternating current supply line that is connected to the chlorinator power supply, and sources heat into aluminum bracket 52. During normal operation, pool water flowing within cooling tube 48 absorbs heat from aluminum bracket 52 and maintains the temperature thereof below the predetermined temperature to which thermostat 56 is responsive. However, when little or no pool water circulates through cooling tube 48, the temperature of aluminum bracket 52 rises until it exceeds the temperature at which thermostat 56 is designed to be triggered, in which event, thermostat 56 switches to an open circuit, thereby disconnecting electrical power from the chlorinator power supply and terminating the further generation of chlorine gas.

It will be recalled that a further object of the present invention relates to the use of pool water to cool the chlorinator power supply, and thereby eliminating the need for air circulation vents within the power supply housing, hence allowing the power supply housing to be constructed as a sealed unit. In this regard, power transformer 58 and rectifier 60 (see FIG. 7) are secured to and in thermal contact with a metal chassis 62 which extends the length of power supply housing 28 and which has downwardly turned end flanges 64 and 66 (see FIG. 5B) to which circular plates 32 and 34 are attached, as by screws 68. Cooling tube 48 is secured against, and in thermal contact with, the upper face of chassis 62 as by clamp strips 70 and 72 and nuts 74 and 76. Accordingly, chassis 62 serves as a heat sink for the primary heat-generating components of the chlorinator power supply, and the pool water circulating through cooling tube 48 serves to remove heat therefrom.

With reference to FIGS. 1 and 5A, a cathode chamber 80 is disposed within the lower portion of brine tank 12 for containing the catholyte of the electrolytic chlorinator. Cathode chamber 80 includes a horizontally-oriented polyvinyl chloride tube 82, a first end of which is closed by a circular end plate 84. The end of tube 82 opposite end plate 84 supports a circular cathode 86. The diameter of cathode 86 slightly exceeds the internal diameter of tube 82, and an annular recess 88 is formed within the internal wall of tube 82 adjacent the open end thereof opposite end plate 84 and having a diameter commensurate with that of cathode 86 for receiving and supporting it. Cathode 86 is preferably formed from 16 gauge, type 304 CRES steel to resist corrosion. Cathode 86 is perforated to permit the passage of catholyte thereabout and to permit hydrogen gas liberated at cathode 86 to pass freely into the central portion of cathode chamber 80.

Electrical coupling is made to cathode 86 by a right-angle bracket 90 which is welded along one face thereof to cathode 86; the opposite face of bracket 90 has a hole formed therein for receiving a screw 92 which, together with nut 94, secure bracket 90 to a first end of electrical wire 96. As shown in FIG. 5A, wire 96 passes through a polyvinyl chloride plug 98, and right-angle bracket 90 extends within plug 98. Plug 98 is filled with a sealing compound (not shown) to isolate screw 92, nut 94, and the exposed portion of electrical wire 96 from the catholyte within cathode chamber 80. Electrical wire 96 is provided with a polyvinyl chloride insulating cover which resists corrosion due to the presence of the catholyte within cathode chamber 80. As shown within FIGS. 5A and B, electrical wire 96 passes out of cathode chamber 80, in a manner described in greater detail below, and extends downwardly along the external wall of tube 14 to power supply housing 28 where it passes through plate 34 for coupling to the chlorinator power supply.

It will be recalled that one of the objects of the present invention is to provide an easily replaceable ion-permeable selective membrane for separating the catholyte within the cathode chamber from the anolyte within the anode chamber or brine tank. In this regard, FIGS. 5A and 9 illustrate the manner in which an easily replaceable membrane assembly is secured over the open end of tube 82 opposite end plate 84 for separating the catholyte within cathode chamber 80 from the brine within brine tank 12. The replaceable membrane assembly is designated generally by reference numeral 100 and includes a pair of parallel rings 102 and 104 each having a diameter substantially equal to the outer diameter of tube 82. Rings 102 and 104 each have parallel opposing radial faces and outer peripheral edges. A circular shaped substantially planar ion-permeable selective membrane 106, having a diameter commensurate with the outer diameters of rings 102 and 104 is positioned between opposing radial faces of rings 102 and 104. Rings 102 and 104 are fastened to one another for supporting membrane 106 between the opposing radial faces thereof along the circumferencial edge of membrane 106. Preferably, rings 102 and 104 are each made of plastic, and plastic welds are formed between rings 102 and 104 adjacent their outer peripheral edges at spaced intervals. Membrane 106 is preferably formed of "NAFION" brand perfluorosulfonic acid membrane, commercially available from E. I DuPont de Nemours and Company of Wilmington, Delaware. Membrane 106 serves to divide cathode chamber 80 from brine tank 12 and allows sodium ions to pass therethrough from brine tank 12 to cathode chamber 80 while substantially preventing hydroxyl ions within cathode chamber 80 from passing therethrough to brine tank 12.

As shown in FIGS. 5A and 9, a circular nut 108 is provided for releasably securing the removable membrane assembly to the open end of tube 82. Nut 108 has an internally threaded bore 110 formed therein, and tube 82 has corresponding threads 112 formed upon the external wall thereof adjacent its open end adapted to be threadedly engaged by threaded bore 110 of nut 108. Nut 108 also includes an annular shoulder 114 extending radially inward from internally threaded bore 110 for clamping membrane assembly 100 against the open end of tube 82. As shown in FIG. 9, a siliconerubber seal 116 is preferably interposed between plastic ring 104 and the open end of tube 82 to improve the seal formed therebetween. When nut 108 is engaged with tube 82, membrane assembly 100 retains cathode 86 within recess 88 of tube 82.

When it is necessary to replace membrane assembly 100, the user need merely rotate nut 108 to disengage it from tube 82, remove the old membrane assembly 100, and substitute a new membrane assembly 100 in its place. The user then retightens nut 108 over the open end of tube 82 in order to resume operation of the chlorinator.

Those skilled in the art will appreciate that the cathode/membrane assembly shown in FIG. 9 provides advantages apart from the ease of membrane assembly replacement. By supporting cathode 86 closely adjacent to membrane assembly 100, the electrical resistance to the flow of ions through the catholyte is minimal even when the ion concentration of the catholyte is relatively low. This feature helps prevent heat buildup within the chlorinator, allowing it to operate more efficiently, and serves to hasten start up of the chlorinator when it is operated for the first time. As will be explained in greater detail below, the head pressure exerted by the brine within brine tank 12 upon membrane 106 exceeds the head pressure of the catholyte within cathode chamber 80, causing membrane 106 to flatten against and become supported by cathode 86. This feature helps to prevent flexing and wear of membrane 106.

As shown in FIG. 5A, an anode 118 is positioned parallel and adjacent to membrane assembly 100. Anode 118 is preferably circular in shape and has a diameter slightly less than membrane assembly 100. Anode 118 is supported at its lower end by anode extension member 120. Both anode 118 and anode extension member 120 are preferably made of Dimensionally Stable Anode Material of the type commercially available from Diamond Shamrock Corporation of Dallas, Texas, which material is made of titanium coated with ruthium. Such anodes are virtually immune to the normally corrosive effects of a super-saturated sodium chloride solution, as well as the chlorine gas liberated at the anode. Anode extension member 120 extends into the upper end of PVC tube 122, the upper portion of which is filled with a plastic sealant 124. The exposed end of electrical wire 126 is secured to the lower end of anode extension member 120 by screw 128 and nut 130 for making electrical contact therewith.

Referring to FIGS. 5A and 5B, the lower end of PVC tube 122 extends within and is received by a socket end of a PVC coupling member 132. The lower, reduced diameter portion of coupling member 132 passes through a correspondingly sized hole 134 formed within bottom wall 16 of brine tank 12. The lower end of coupling member 132 is threaded for engaging a tightening nut 136 for sealing coupling member 132 against the upper face of bottom wall 116. Referring briefly to FIG. 2, electrical wire 126 passes outwardly through a hole 138 formed in the wall of tube 20 and extends through a hole formed in endplate 34 for electrical coupling to the positive output terminal of the chlorinator power supply within power supply housing 28. A silicone rubber washer 140 is positioned between coupling member 132 and bottom wall 16 to form a leak proof seal therebetween when nut 136 is tightened.

As is known to those skilled in the art, electrolytic pool chlorinators generate chlorine gas at the anode terminal thereof by attracting negatively charged chloride ions to the positively charged anode terminal for liberating chlorine gas. Solid salt is deposited within brine tank 12 of chlorinator 10, and water is supplied to brine tank 12 (in a manner described in greater detail below) to provide a saturated brine solution. Referring to FIG. 5A, chlorinator 10 includes a baffle, designated generally by reference numeral 142, which baffle serves to both collect liberated chlorine gas while preventing solid rock salt from forming salt cakes around anode 118 and thereby interfering with the flow of current between the anode and cathode. Baffle 142 includes a lower section 144 and an upper section 146. As shown in FIGS. 1 and 5A, lower section 144 extends around the lower half of the membrane end of cathode chamber 80, while upper section 146 extends about the upper half of the membrane end of cathode chamber 80. As shown in FIG. 5A, lower baffle section 144 has a tubular opening 148 at the lower end thereof through which PVC coupler 132 and PVC tube 122 extend. In addition, fresh saturated brine within brine tank 12 is admitted through opening 148 and fills the volume bounded by baffle 142. Lower baffle section 144 includes a semicircular plate 150, a semicylindrical sidewall 152, and an annular shoulder 154 for engaging the underside of cathode chamber tube 82. Similarly, upper baffle section 146 includes a semicircular plate 156, a semicylindrical sidewall 158, and an annular shoulder 160 for engaging the upper half of cathode chamber tube 82. Flanges 162 and 164 extend from the upper end of baffle section 144 and the lower end of baffle section 146, respectively, and a PVC bolt 166 extends through a hole formed in flange 164 for engaging a threaded hole in flange 162 to releasably secure upper baffle section 146 to lower baffle section 144. Upper baffle section 146 might be removed, for example, to provide access to cathode chamber tightening nut 108 when it is desired to replace membrane assembly 100.

A tubular neck 168 extends upwardly from sidewall 158 of upper baffle section 146 for receiving the lower end of a chlorine gas riser tube 170 through which liberated chlorine gas collected by baffle 142 rises. The upper end of riser tube 170 is received within a first longitudinal opening 171 of a T-shaped coupling member 172. A second longitudinal opening 174 of member 172 is sealed by a reducing plug 176 having a reduced diameter bore 178 formed therein. A third opening 180 extends from T-shaped member 172 perpendicular to the longitudinal axis thereof and receives a first end of an elbow member 182. Extending downwardly from the opposite end of elbow 182 is a PVC tube 184 the lower end of which extends to approximately the level of baffle 142.

As chlorine gas rises upwardly through tube 170, the bubbles of chlorine gas tend to entrain the brine solution therewith. The purpose of elbow 182 and tube 184 is to equalize the fluid levels within brine tank 12 and riser tube 170 to prevent the loss of the brine solution upwardly out of riser tube 170. The level of the brine solution within brine tank 12 is automatically maintained approximately at the mid point of opening 180 within T-shaped member 172, in a manner described in greater detail below. Elbow 182 and tube 184 equalize the fluid pressures within brine tank 12 and riser tube 170. Tube 184 extends downwardly to a sufficient depth to insure that any chlorine gas bubbles which may enter elbow 182 will not escape into brine tank 12.

Referring to FIGS. 1, 4 and 5A, a first end of an elbow member 185 is received within reducing plug 176 and communicates with bore 178 therein for conveying liberated chlorine gas. The opposing end of elbow 185 receives a first end of a horizontally-oriented PVC tube 186, the opposite end of which is received by a first end of elbow 188. The second end of elbow 188 extends downwardly and receives the upper end of a short stub tube 190, the opposite end of which is cemented to the upper face of a plug 192. A slip-fit (i.e., not cemented) is formed between the lowermost opening of elbow 188 and stub tube 190. In this manner, those components designated by reference numerals 146 and 170-188 may be cemented together and assembled as a single unit.

As mentioned above, it is necessary to chemically react the chlorine gas liberated at anode 118 with the pool water to be chlorinated in order to form an effective sterilizing agent. As is known to those skilled in the art, chlorine gas reacts with water to form hypochlorous acid (the sanitizing agent) and hydrochloric acid. To effectively react the chlorine gas collected by baffle 142 and conveyed by components 170-188, the chlorine gas is introduced into a packed reaction column 194. Packed column 194 includes a vertically-oriented tube 196, the upper end of which is capped by plug 192. A smaller vertical tube 198 extends downwardly within and through stub tube 190 and downwardly through tube 196 to a lower end 199 (see FIG. 5B). The volume bounded by outer tube 196 and inner tube 198 is packed with ceramic berl saddles 200 (see FIG. 8) or similar packing material for providing a relatively large surface area. Pool water is introduced at the upper end of tube 196, in a manner described below, and flows downwardly through packed column 194 while passing over the large surface area presented by the packing material therein. Chlorine gas released at the lower end 199 of inner tube 198 rises upwardly through the packing material, in a counterflow arrangement, and reacts with water flowing downwardly through packed column 194. As shown in FIGS. 5A and 5B, packed column tube 196 extends through a hole 202 formed within bottom wall 16 and is cemented thereto to form a leak proof seal. The lower end 204 of tube 196 terminates just above bottom wall 22 of feeder tank 26 for releasing chlorinated pool water therein. As shown in FIG. 5B, lower end 204 of packed column tube 196 extends below the normal fluid level 206 within feeder tank 26; accordingly, any unreacted chlorine gas within packed column 194 is prevented from escaping downwardly through tube 196 to the atmosphere.

Figure 6:
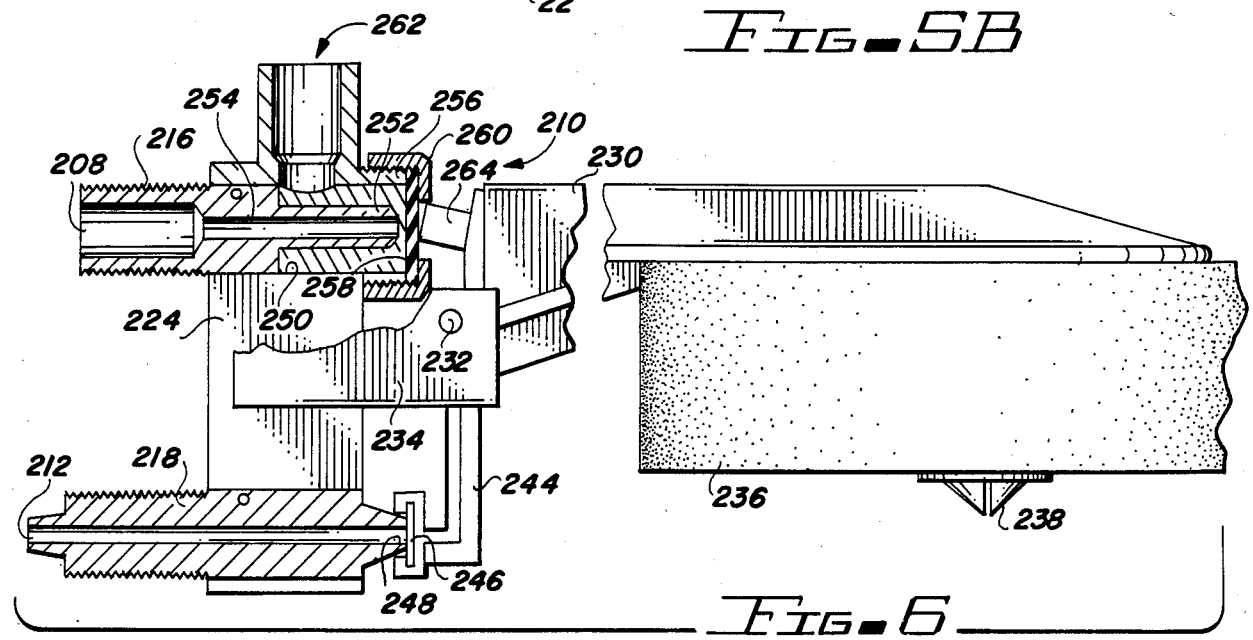
FIG. 6 is an enlarged view of the float valve mechanism shown in FIG. 5B.

As noted above, one of the objects of the present invention is to automatically and continuously maintain proper levels of anolyte within brine tank 12 and catholyte within cathode chamber 80. As further noted above, packed column 194 requires a source of pool water at its upper end for reaction with the chlorine gas collected by baffle 142. In this regard, the pressurized stream of pool water which exits cooling tube 48 through compression connector 42 (see FIG. 2) is conveyed by conduit 46 to a similar compression connector 50 shown in FIG. 3. With reference to FIGS. 3, 5B, and 6, compression connector 50 is coupled to a first port 208 of a float-operated dual-control valve designated generally by reference numeral 210. Float-valve assembly 210 includes a second port 212 coupled by way of a further compression connector 214 to one end of a conduit (not shown), the other end of which is coupled to the suction side of the pump within the pool water recirculation system. Chlorinated water within feeder tank 26 flows outwardly through port 212 for return to the swimming pool. As shown in FIGS. 5B and 6, port 208 and port 212 are formed by externally threaded tubes 216 and 218, respectively, which extend through corresponding holes formed in the sidewall of feeder tank tube 20 and are engaged by mating nuts 220 and 222, respectively, to support float-valve assembly 210 within feeder tank 26. Tubes 216 and 218 extend from a rectangular-shaped valve body 224, and sealing gaskets 226 and 228 extend about tubes 216 and 218, respectively, to form a leakproof seal between valve body 224 and the inner wall of feeder tank tube 20.

Still referring to FIGS. 3, 5B and 6, a float arm 230 is pivotally coupled by pivot pin 232 to a yoke 234 secured to and extending from valve body 224. The portion of the float arm 230 extending rightwardly (relative to FIG. 6) from pivot pin 232 has a styrofoam float 236 secured thereto by screw 238. A pair of weights 240 and 242, shown in dashed outline within FIG. 5B, are incorporated within float 236 to normally bias float arm 230 in a clockwise direction about pivot pin 232, relative to FIG. 6. Float 236 is buoyed upwardly by the chlorinated pool water deposited within feeder tank 26 by packed column 194.

As shown in FIG. 6, valve member 244 extends downwardly from float arm 230 proximate to pivot pin 232. A flexible seal 246 is positioned within and retained by the end of valve member 244 opposite pivot pin 232 for selectively engaging and sealing opening 248 within tube 218. FIG. 6 illustrates the position of valve member 244 when the fluid level of the chlorinated water within feeder tank 26 is below a nominal height. As the level of the pool water within feeder tank 26 rises toward the nominal height, float arm 230 rotates counterclockwise, relative to FIG. 6, thereby moving seal 246 out of engagement with opening 248; consequently, freshly chlorinated pool water within feeder tank 26 may be withdrawn through opening 248 and port 212 for being conveyed to the suction side of the pool pump. On the other hand, when the level of pool water within feeder tank 26 begins to drop, seal 246 is again brought into engagement with opening 248 for preventing the further withdrawal of pool water from feeder tank 26, and thereby preventing the pool pump from suctioning air within feeder tank 26. Those skilled in the art will appreciate that float valve assembly 210 is so arranged to seal opening 248 prior to the water level within feeder tank 26 from falling to the level of opening 248.

Float valve assembly 210 is also used to control the incoming stream of poolwater received from cooling tube 48. As shown in FIG. 6, tube 216 extends partially into a bore 250 formed within valve body 224. The end of tube 216 opposite port 208 forms a reduced diameter portion 252, and a longitudinal bore 254 extends through portion 252 and opens into port 208. Valve body 224 includes an externally threaded annular ring 256 which extends around and slightly beyond reduced diameter portion 252 of tube 216. A flexible diaphragm 258 is secured over the open end of ring 256 by a nut 260. Outlet port 262 extends upwardly from valve body 224 in fluid communication with bore 250.

With float arm 230 in the position shown in FIG. 6, the stream of pressurized water received by port 208 of valve assembly 210 is emitted from the opening of bore 254 into bore 250 and is forced upwardly through outlet port 262. However, as the water level within feeder tank 26 rises above the nominal height, float arm 230 rotates in a counterclockwise direction, relative to FIG. 6, and a peg 264 extending therefrom forces flexible diaphragm 258 into sealing engagement with the opening of bore 254, thereby shutting off the further flow of pool water through outlet port 262 until the water level within feeder tank 26 again drops to the nominal height. While not ordinarily required, servicing of the float valve assembly 210 may be made by removing an access door 266 secured to the external wall of feeder tank tube 20 by screw 268, as shown in FIG. 3.

Referring to FIGS. 5A and 5B, outlet port 262 of float valve assembly 210 is received within the lower end of coupling tube 270, the upper end of which receives the lower end of a vertically-oriented PVC tube 272. Tube 272 passes upwardly through bottom wall 16 of brine tank 12 through opening 274. The uppermost end of tube 272 is received within a first opening 276 of elbow member 278. A second opening 280 of elbow 278 receives one end of a horizontally-oriented PVC tube 282. A relatively short tube 284, referred to herein as a downspout, has its upper end passing through aligned holes formed within elbow 278 and tube 282 and communicates with the fluid passage within tube 282. The end of tube 282 opposite elbow 278 is received by a further elbow 286, and a further downspout 288, of larger diameter than downspout 284, extends downwardly from elbow 286.

Figure 8:
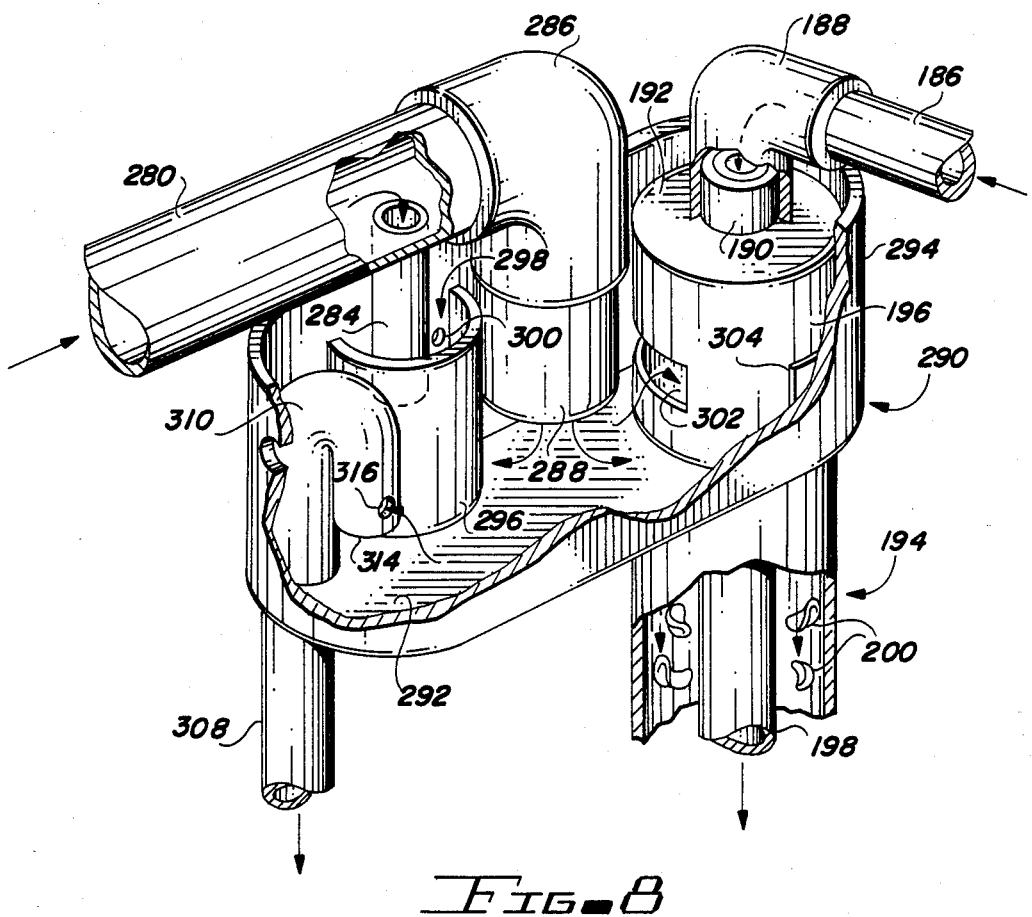
FIG. 8 is a cutaway perspective view of a water distribution chamber encircled within dashed oval 8 within FIG. 4.

As shown in FIGS. 1, 5A, and 8, a water distribution chamber, designated generally by reference numeral 290 is located within the upper portion of brine tank 12 and serves to automatically distribute fresh pool water to brine tank 12, to cathode chamber 80, and to packed column 194. Distribution chamber 290 is formed by an oval-shaped bottom wall 292 and a corresponding-shaped sidewall 294 extending upwardly therefrom. As shown within FIG. 8, a semicircular wall 296 is cemented to bottom wall 292 and to sidewall 294 of distribution chamber 290 and divides distribution chamber 290 into a smaller compartment 298 within sidewall 296 and a larger compartment lying outside sidewall 296. Within FIG. 5A, semicircular wall 296 is shown schematically in cross-section. Downspout 284 extends into smaller compartment 298 of distribution chamber 290 and supplies pool water thereto.

In order to fill brine tank 12 with water and to thereafter maintain the level of water therein, a hole 300 is formed in sidewall 294 adjacent smaller compartment 298, and pool water deposited within smaller compartment 298 by downspout 284 passes through hole 300 into brine tank 12 for filling the same. As shown in FIG. 5A, the upper edge of sidewall 296 extends above hole 300 and accordingly, all pool water deposited within smaller compartment 298 flows out hole 300 until the level of water within brine tank 12 reaches the height of the upper edge of sidewall 296. After brine tank 12 is filled with water to such level, additional pool water carried into smaller compartment 298 by downspout 284 overflows the upper edge of sidewall 296 into the larger compartment of distribution chamber 290. Should the level of the brine solution within brine tank 12 temporarily fall below the height of the upper edge of sidewall 296, pool water within smaller compartment 298 again passes outwardly through hole 300 to automatically reestablish the level of the fluid within brine tank 12. As shown within FIG. 5A, downspout 284 preferably extends below hole 300 to form a water trap within downspout 284, thereby preventing any chlorine gas fumes within brine tank 12 from passing upwardly through downspout 284 when the pool pump is not being operated.

While a portion of the incoming pool water received by tube 280 passes through downspout 284 into smaller compartment 298, a larger portion of the incoming pool water is directed through downspout 288 into the larger compartment of distribution chamber 290. The majority of the pool water deposited within the larger compartment of distribution chamber 290 flows into packed column 194 for reaction with chlorine gas carried into the packed column by tube 198. The upper end of packed column tube 196 extends upwardly through bottom wall 292 of distribution chamber 290. A pair of slots 302 and 304 are formed within tube 196 at a height below that of the upper edge of sidewall 296 for draining excess pool water from the larger compartment of distribution chamber 290. Preferably, downspout 288 extends below the level of slots 302 and 304 to form a water trap within the lower end of downspout 288, thereby preventing any chlorine gas fumes present within brine tank 12 from passing upwardly through downspout 288.

When the pool pump within the pool water recirculation system is shut off, the flow of pressurized pool water to the chlorinator stops, and water within cooling tube 48 and vertical tube 272 tends to drain back into the swimming pool. To prevent the siphoning of the water remaining within smaller compartment 298 and the larger compartment of water distribution chamber 290 in this instance, tube 282 is vented to the atmosphere to relieve the vacuum which would otherwise result when pool water within tube 272 drains therefrom. As shown in FIG. 1, a small vent pipe 306 has a first end which passes through a hole formed in elbow 286 and has a second end which passes through a hole formed in brine tank tube 214 for venting the interior of elbow 286 to atmosphere. For convenience, vent pipe 306 is shown in FIG. 5A as communicating with elbow 278. In practice, it makes little difference which elbow vent pipe 306 communicates with.

It will be recalled that one of the objects of the present invention is to fill and maintain the proper level of catholyte within the cathode chamber and to continuously dilute the sodium hydroxide concentration thereof in a manner which minimizes the formation of calcium deposits upon the cathode. In this regard, a conduit 308 is provided for continuously delivering pool water from the larger compartment of distribution chamber 290 to cathode chamber 80. Conduit 308 extends upwardly through a hole formed in the bottom wall 292 of distribution chamber 290, and the upper end of conduit 308 is formed into an inverted U-shaped portion 310. The lowermost bend within the inner wall of portion 310, designated by reference numeral 312, is maintained below the height of slots 302 and 304. The end of upper portion 310 of conduit 308 is closed by a cap 314, and a small hole 316 is drilled into the sidewall of conduit 308 between end cap 314 and lowermost bend 312. During normal operation of the pool chlorinator, the level of the water within the larger compartment of distribution chamber 290 is commensurate with the lowermost edge of slots 302 and 304 of packed column 194. In this event, water entering upper portion 310 of conduit 308 via hole 316 passes over bend 312 and flows downwardly through conduit 308. The relative size of hole 316, and the height of lowermost bend 310 relative to the height of slots 302 and 304, determine the flow rate of water downwardly through conduit 308. In addition, by positioning hole 316 below the level of lowermost bend 312, a water trap is formed within upper portion 310 of conduit 308, thereby preventing the passage of any chlorine gas or hydrogen gas through conduit 308, even during those periods when the pool pump is turned off and ceases to supply fresh pool water to the chlorinator.

The lowermost end of conduit 308 extends through an appropriately sized hole formed in the upper portion of an elbow member 318 shown in FIGS. 1 and 5A. The lowermost end of elbow member 318 extends within a first longitudinal opening 320 of a T-shaped member 322. A second longitudinal opening 324 of T-shaped member 322 is received within a circular hole 326 formed within the upper portion of cathode chamber tube 82 proximate to endplate 84 and remote from cathode 86. A horizontally-oriented tube 328 extends from elbow 318 through an annular ring 330 which is, in turn, seated within a hole 332 formed in brine tank tube 14. Tube 328 serves to vent hydrogen gas generated within cathode chamber 80 to the atmosphere for preventing accumulations of hydrogen gas therein, and further serves as a passageway through which electrical wire 96 may be guided from the chlorinator power supply for coupling with cathode 86.

Still referring to FIG. 5A, a small stream of water is continuously delivered by the lowermost end of conduit 308 into the upper end of T-shaped member 322. In this manner, pool water is continuously delivered to cathode chamber 80 at a point remote from cathode 86. In order to remove the concentrated sodium hydroxide catholyte solution displaced by the incoming flow of pool water, an overflow conduit is provided for draining off the displaced catholyte. T-shaped member 322 includes a third opening 334 extending perpendicularly therefrom for receiving a first end of overflow tube 336, the second end of which is coupled by elbow 338 to a downwardly directed drain tube 340 which passes through a hole 342 formed in the bottom wall 16 of brine tank 12. The lower end of drain tube 340 passes into a water trap cup 344 supported within the upper portion of feeder tank 26. A compression connector fitting 346 is threadedly engaged with a threaded hole in cup 344 and includes a longitudinal bore 348 for draining any flushed catholyte within water trap cup 344 extending above the fluid level indicated by dashed lines 350. The lowermost end of drain tube 340 extends below fluid level 350 to provide a water trap that prevents any hydrogen gas within drain tube 340 from escaping into feeder tank 26. The excess catholyte passing through bore 348 of compression connector 346 may simply be allowed to flow into and mix with the chlorinated water contained within the lower portion of feeder tank 26; alternatively, a drain tube (not shown) may optionally be coupled to compression connector 346 for draining flushed sodium hydroxide solution to waste. If the catholyte overflow from connector 346 is allowed to drain into feeder tank 26, then approximately one-half of the sodium hydroxide deposited into feeder tank 26 is neutralized by hydrochloric acid deposited therein by packed column 194. The end result is that the chlorinated water returned to the pool from feeder tank 26 tends to slightly raise the pH of the pool water. On the other hand, the overflow from connector 346 is diverted to waste, the hydrochloric acid formed within packed column 194 is left unneutralized within feeder tank 26 and tends to lower the pH of the swimming pool.

As shown in FIG. 5A, the portion of T-shaped member 322 extending upwardly from opening 324 effectively provides a short standpipe near the upper end of cathode chamber 80 remote from cathode 86. Fresh pool water is delivered by conduit 308 to the upper end of the standpipe, while overflow tube 336 is coupled to the standpipe for maintaining the level of catholyte within the standpipe essentially constant. While the incoming pool water delivered by conduit 308 typically has a calcium hardness in the range to 200 to 250 parts per million, calcium deposits upon cathode 86 are substantially prevented by adding such fresh pool water to cathode chamber 80 at a point remote from cathode 86 at a controlled rate. In the preferred embodiment of the present invention, the standpipe formed by T-shaped member 322 is located approximately six to seven inches from cathode 86. Calcium tends to precipitate as a non-soluble compound, typically as calcium hydroxide or calcium carbonate, when exposed to an alkaline environment of a pH of appoximately 8.0 or higher. In the preferred embodiment of the present invention, the rate at which fresh pool water is added to cathode chamber 80 is adjusted to maintain the sodium hydroxide concentration of the catholyte to approximately 1%-2%. It has been found that a sodium hydroxide concentration in this range is sufficiently low to prevent significant amounts of back-migration of hydroxyl ions through the ion-permeable membrane when the chlorinator is not being operated. Since the pH of a 1%-2% sodium hydroxide catholyte solution is well above 13.0, any calcium which slowly diffuses into cathode chamber 80 via the standpipe promptly precipitates out as an insoluble compound prior to reaching cathode 86. Precipitation of calcium upon non-functional portions of cathode chamber 80, (i.e., endplate 84 and tube 82) does not reduce the efficiency of the chlorinator and, in fact, helps to prevent calcium from depositing upon the components of float valve assembly 210 within feeder tank 26 and within the pool water return line leading from valve assembly 210 back into the pool pump.

Referring to FIG. 5A, overflow tube 336, in conjunction with pool water delivery conduit 308 serve to maintain a constant level of catholyte within cathode chamber 80 and further serve to continuously flush quantities of sodium hydroxide from the cathode chamber to maintain the sodium hydroxide concentration, and hence the hydroxyl ion content, of the cathode chamber within the above-mentioned desired range. Moreover, because of the unique construction of distribution chamber 290, the stream of fresh pool water delivered by conduit 308 to cathode chamber 80 is substantially constant and independent of the flow rate or pressure of pool water that is supplied to the chlorinator from the pressurized side of the water recirculation system of the pool. In addition, the water distribution chamber 290 automatically maintains a positive head pressure within brine tank 12 relative to the pressure within cathode chamber 80, thereby maintaining ion-permeable membrane 106 (see FIG. 9) in close proximity to cathode 86.

Other than periodically recharging the supply of salt within brine tank 12, perhaps at six month intervals, the chlorinator is essentially maintenance free. During initial start-up of the chlorinator, brine tank 12 is filled with solid salt by removing a salt filler plug 252 to expose the upper end of a filler tube 254 secured to upper lid 18, as shown in FIG. 1. Filler tube 254 extends slightly below the uppermost wall of water distribution chamber 290 to prevent the same from becoming filled with salt. Filler plug 252 is then replaced, and the pool water connections are made between the water recirculation system and compression connectors 44 and 214 of the chlorinator. Power supply cord 47 is coupled to a suitable source of alternating current, and control knob 36 is adjusted to provide the desired rate of chlorine gas production.

At approximately six to twelve month intervals, filler plug 252 is removed, and brine tank 12 is again filled with solid salt. Because the back-migration of hydroxyl ions into brine tank 12 is controlled, the salt added to brine tank 12 need not be of any specialized purity. Nonetheless, any chlorates or other contaminants which may accumulate within brine tank 12 between salt rechargings tend to be flushed out of brine tank 12 as new salt is added; the brine solution displaced by the added salt spills over into distribution chamber 290 and drains through packed column 194 into feeder tank 26.

Following the salt-filling procedure described above, the chlorinator may be turned on, and the proper levels of anolyte and catholyte are automatically reestablished by distribution chamber 290. No further maintenance is ordinarily required until it is once again necessary to refill brine tank 12 with salt.

While the present invention has been described with regard to a preferred embodiment thereof, the foregoing description is for illustrative purposes only and is not to be construed as limiting the scope of the invention. Various modifications and changes may be made by those skilled in the art without departing from the true spirit and scope of the invention as defined by the appended claims.

I claim:

1. An electrolytic pool chlorinator for chlorinating a pool of water, said pool of water including a filter and a pump for circulating pool water between the pool and the filter, said electrolytic pool chlorinator comprising in combination:
   a. an anode chamber for containing a quantity of salt and water to form a brine solution;
   b. an anode disposed within said anode chamber;

c. a cathode chamber for containing a catholyte including sodium hydroxide;
d. a cathode disposed within said cathode chamber;
e. an ion permeable selective membrane dividing said cathode chamber from said anode chamber and allowing sodium ions to pass through said membrane from said anode chamber to said cathode chamber while substantially preventing hydroxyl ions within said cathode chamber from passing through said membrane to said anode chamber;
f. an electrical power supply coupled to said anode and to said cathode for imposing a direct current electrical potential thereacross and for liberating chlorine gas at said anode and hydrogen gas at said cathode;
g. collection means for collecting chlorine gas liberated in said anode chamber and intermixing the chlorine gas with pool water for chlorinating the pool water;
h. inlet means in fluid communication with the pump for receiving a stream of pool water under pressure from the pool; and
i. distribution means coupled to said inlet means and receiving said stream of pool water, said distribution means serving to continously add pool water to said anode chamber whenever the brine solution contained therein falls below a predetermined fluid level, said distribution means further serving to continuously add pool water to said cathode chamber for maintaining a predetermined level of catholyte therein and for continuously diluting the concentration of sodium hydroxide within said catholyte, said distribution means being disposed at an upper end of said anode chamber and including a first compartment for continuously receiving pool water, said first compartment having a hole therein at a first predetermined height through which hole pool water passes into said anode chamber, said distribution means including a second compartment contiguous with said first compartment and sharing at least one common wall therewith, said common wall extending above said first predetermined height to a second predetermined height and allowing pool water within said first compartment reaching said second predetermined height to spill over said common wall into said second compartment, said distribution means further including conduit means in fluid communication with said second compartment for conveying pool water therefrom to said cathode chamber.

2. An electrolytic pool chlorinator as recited by claim 1 wherein said pool chlorinator includes an overflow conduit communicating with said cathode chamber for permitting catholyte exceeding said predetermined level of catholyte to overflow from said cathode chamber for maintaining said predetermined level of catholyte therein and for permitting quantities of sodium hydroxide to continuously be flushed from said cathode chamber by the pool water continuously added to said cathode chamber by said conduit means.

3. An electrolytic pool chlorinator as recited by claim 1 wherein said inlet means includes a downspout extending substantially vertically downward into said first compartment, said downspout terminating in an open end located below said first predetermined height to prevent said downspout from releasing any chlorine gas from said anode chamber.

4. An electrolytic pool chlorinator as recited by claim 1 wherein said distribution means includes means for maintaining the level of pool water within said second compartment at a third predetermined height below said second predetermined height, and wherein said conduit means has an upper end communicating with said second compartment and a lower end communicating with said cathode chamber, the upper end of said conduit means including a generally inverted U-shaped portion having a central bend region which extends below said third predetermined height and having a terminal end thereof below the central bend region of said U-shaped portion for allowing pool water within said second compartment to be passed into said conduit means while forming a water trap in the terminal end of said U-shaped portion for preventing hydrogen gas within said cathode chamber and chlorine gas within said anode chamber from mixing with one another.

5. An electrolytic pool chlorinator as recited by claim 4 wherein said collection means includes a vertically-oriented packed column conatining a packed bed of material adapted to intermix pool water and said liberated chlorine gas to form hypochlorous acid and hydrochloric acid, and wherein said means for maintianing the level of pool water within said second compartment at the third predetermined height comprises means in fluid communication with said second compartment for draining pool water from said second compartment to an upper end of said packed column, said means having an opening formed therein at said third predetermined height through which opening pool water within said second compartment passes into said packed column.

6. An elecrolytic pool chlorinator as recited by claim 1 wherein said collection means includes a vertically-oriented packed column containing a packed bed of material adapted to intermix pool water and said liberated chlorine gas to form hypochlorous acid and hydrochloric acid, and wherein said distribution means serves to continuously introduce pool water to an upper end of said packed column.

7. An electrolytic pool chlorinator for chlorinating a pool of water, comprising in combination:
a. an anode chamber for containing a quantity of salt and water to form a brine solution;
b. an anode disposed within said anode chamber;
c. a cathode chamber for containing a catholyte, said cathode chamber including a tubular portion having an open end of a first predetermined diameter, said tubular portion being externally threaded adjacent the open end thereof;
d. a cathode disposed within said cathode chamber;
e. an electrical power supply coupled to said anode and to said cathode for imposing a direct current electrical potential thereacross and for liberating chlorine gas at said anode and hyrdrogen gas at said cathode;
f. a replaceable circular membrane assembly having a diameter substantially commensurate with said first predetermined diameter, said membrane assembly including a substantially planar ion premeable selective membrane for dividing said cathode chamber from said anode chamber and allowing sodium ions to pass therethrough from said anode chamber to said cathode chamber while substantially preventing hydroxyl ions within said cathode chamber from passing therethrough to said anode chamber; and g. a circular nut for retaining said membrane assembly engaged with and secured over the open end of said tubular portion of said cathode chamber, said circular nut having an internally threaded bore adapted to threadedly engage the external threads of said tubular portion of said cathode chamber, said circular nut including an annular shoulder extending radially inward from said internally threaded bore for clamping said membrane assembly against the open end of said tubular portion of said cathode chamber.

8. An electrolytic pool chlorinator as recited by claim 7 wherein said replaceable membrane assembly comprises:
   a. first and second parallel rings each having an outer diameter commensurate with said first predetermined diameter and each having parallel opposing radial faces and each having outer peripheral edges;
   b. a circular shaped ion permeable selective membrane having a diameter commensurate with the outer diameters of said first and second rings, said membrane being positioned between opposing radial faces of said first and second rings; and
   c. fastening means for fastening together said first and second rings along parallel opposing radial faces thereof for supporting said membrane therebetween.

9. An electrolytic pool chlorinator as recited by claim 8 wherein said first and second rings are formed of plastic and wherein said fastening means comprises plastic welds formed between said first and second rings adjacent the outer peripheral edges thereof.

10. An electrolytic pool chlorinator as recited by claim 7 further including an annular seal disposed between said replaceable membrane assembly and the open end of said tubular portion of said cathode chamber to sealingly engage said replaceable membrane assembly to the open end of said tubular portion.

11. An electrolytic pool chlorinator as recited by claim 7 wherein said tubular portion of said cathode chamber includes an annular recess formed within an internal wall thereof adjacent the open end thereof, and wherein said cathode is circular in shape and of a diameter commensurate with that of said annular recess for permitting said cathode to be received within and supported by said annular recess closely proximate to said replaceable membrane assembly.

12. An electrolytic pool chlorinator for chlorinating a pool of water, said pool of water including a filter and a pump for circulating pool water between the pool and the filter, the electrolytic pool chlorinator comprising in combination:
   a. an electrolytic cell including an anode chamber having an anode therein, a cathode chamber having a cathode therein, and an ion permeable selective membrane for dividing the anode and cathode chambers from one another;
   b. an electrical power supply coupled to said anode and to said cathode for imposing a direct current electrical potential thereacross and for liberating chlorine gas at said anode and hydrogen gas at said cathode;
   c. inlet means in fluid communication with the pump for receiving a stream of pool water from the pool;
   d. intermixing means for intermixing chlorine gas liberated in the anode chamber with pool water received by said inlet means;
   e. a metal conduit interposed between said inlet means and said intermixing means, the pool water received by said inlet means passing through said metal conduit;
   f. a heat source in thermal contact with said metal conduit; and
   g. a thermostatic switch in thermal contact with said metal conduit, said thermostatic switch connecting electrical power to said electrical power supply when the temperature of said metal conduit is below a predetermined determined temperature, said thermostatic switch disconnecting electrical power from said electrical power supply when the temperature of said metal conduit is above said predetermined temperature, said thermostatic switch being operative to detect a decrease in the flow of pool water through said metal conduit in the form of a rise in the temperature thereof and being responsive thereto by turning off said electrical power supply to prevent the further generation of chlorine gas within said electrical pool chlorinator.

13. An electrolytic pool chlorinator as recited by claim 12 wherein said heat source and said thermostatic switch are supported by a metal bracket in thermal contact with said metal conduit.

14. An electrolytic pool chlorinator as recited by claim 12 wherein said electrical power supply includes at least one heat generating component and wherein said heat generating component is mounted in thermal contact with said metal conduit for allowing pool water passing through said metal conduit to remove heat from said heat generating component.

15. An electrolytic pool chlorinator as recited by claim 14 wherein said heat generating component is a transformer.

16. An electrolytic pool chlorinator as recited by claim 14 wherein said heat generating component is a rectifier.

17. An electrolytic pool chlorinator for chlorinating a pool of water, said pool of water including a filter and a pump for circulating pool water between the pool and the filter, said electrolytic pool chlorinator comprising in combination:
   (a) an anode chamber for containing a quantity of salt and water to form a brine solution;
   (b) an anode disposed within said anode chamber;
   (c) a cathode chamber for containing a catholyte including sodium hydroxide;
   (d) a cathode disposed within said cathode chamber;
   (e) an ion permeable selective membrane dividing said cathode chamber from said anode chamber and allowing sodium ions to pass through said membrane from said anode chamber to said cathode chamber while substantially preventing hydroxyl ions within said cathode chamber from passing through said membrane to said anode chamber;
   (f) an electrical power supply coupled to said anode and to said cathode for imposing a direct current electrical potential thereacross and for liberating chlorine gas at said anode and hydrogen gas at said cathode;
   (g) collection means for collecting chlorine gas liberated in said anode chamber and intermixing the chlorine gas with pool water for chlorinating the pool water, said collection means including a vertically-oriented packed column containing a packed bed of material adapted to intermix pool water and said liberated chlorine gas to form hypochlorous and hydrochloric acid;

(h) inlet means in fluid communication with the pump for receiving a stream of pool water under pressure from the pool; and (i) distribution means coupled to said inlet means and receiving said stream of pool water, said distribution means serving to continuously add pool water to said anode chamber whenever the brine solution contained therein falls below a predetermined fluid level, said distribution means further serving to continuously add pool water to said cathode chamber for maintaining a predetermined level of catholyte therein and for continuously diluting the concentration of sodium hydroxide within said catholyte, said distribution means serving to continuouosly introduce pool water to an upper end of said packed column.

18. An electrolytic pool chlorinator for chlorinating a pool of water, comprising in combination:

(a) an anode chamber for containing a quantity of salt and water to form a brine solution;

(b) an anode disposed with said anode chamber;

(c) a cathode chamber for containing a catholyte including sodium hydroxide;

(d) a cathode disposed within said cathode chamber;

(e) a standpipe having upper and lower ends, the lower end of said standpipe being coupled to said cathode chamber relatively remote from said cathode, said standpipe extending upwardly from said cathode chamber;

(f) an ion permeable selective membrane dividing said cathode chamber from said anode chamber and allowing sodium ions to pass through said membrane from said anode chamber to said cathode chamber while substantially preventing hydroxyl ions within said cathode chamber from passing through said membrane to said anode chamber;

(g) an electrical power supply coupled to said anode and to said cathode for imposing a direct current electrical potential thereacross and for liberating chlorine gas at said anode and hydrogen gas at said cathode;

(h) inlet means for receiving a stream of pool water under pressure from the pool;

(i) a conduit coupled to said inlet means for receiving pool water therefrom, said conduit continuously delivering pool water to the upper end of said standpipe of said cathode chamber at a controlled rate at a point relatively remote from said cathode for causing any calcium within said pool water delivered to said cathode chamber to encounter an alkaline environment and to be precipitated as an insoluble compound prior to reaching said cathode; and (j) an overflow conduit communicating with said cathode chamber for permitting catholyte exceeding a predetermined level to overflow from said cathode chamber for maintaining said predetermined level of catholyte therein and for permitting quantites of sodium hydroxide to continuously be flushed from said cathode chamber by the pool water continuously delivered to said cathode chamber by said conduit for substantially preventing the hydroxyl ion content of said catholyte from becoming concentrated enough to permit backmigration of hydroxyl ions from said cathode chamber to said anode chamber when said power supply is interrupted, said overflow conduit being coupled at a first end thereof to said standpipe for maintaining the level of catholyte within said standpipe essentially constant.

* * * * *